United States Patent [19]

Shimizu et al.

[11] Patent Number: 5,213,825

[45] Date of Patent: May 25, 1993

[54] PLASTIC LENS MOLDING APPARATUS

[75] Inventors: Toshihiko Shimizu; Osamu Aruga, both of Suwa, Japan

[73] Assignee: Seiko Epson Corporation, Tokyo, Japan

[21] Appl. No.: 751,727

[22] Filed: Aug. 29, 1991

[30] Foreign Application Priority Data

Aug. 30, 1990 [JP] Japan .................. 2-229170

[51] Int. Cl.[5] .................. B29C 45/26; B29D 11/00
[52] U.S. Cl. .................. 425/595; 425/423; 425/808; 264/1.1; 249/154
[58] Field of Search .................. 425/808, 595, 423; 264/1.7, 1.8, 1.9, 1.1; 249/154

[56] References Cited

U.S. PATENT DOCUMENTS

| | | | |
|---|---|---|---|
| 2,406,361 | 8/1946 | Fairbank et al. | 425/808 |
| 2,728,106 | 12/1955 | Herman et al. | 425/808 |
| 3,211,811 | 10/1965 | Lanman | 425/808 |
| 3,273,204 | 9/1966 | Craddock | 425/808 |
| 3,460,928 | 8/1969 | Casko | 425/808 |
| 3,902,693 | 9/1975 | Crandon et al. | 425/808 |
| 4,163,541 | 8/1979 | Campbell | 425/808 |
| 4,383,672 | 5/1983 | Kreuttner | 425/808 |
| 4,659,524 | 4/1987 | Neefe | 425/808 |

*Primary Examiner*—Jay H. Woo
*Assistant Examiner*—Khanh P. Nguyen
*Attorney, Agent, or Firm*—Ladas & Parry

[57] ABSTRACT

A plastic lens molding apparatus. A first mold, having a concave optical surface, and a second mold, having a convex optical surface, are arranged so that the optical surfaces are opposed to each other, each of the optical surfaces having an apex. An adhesive tape is applied over both the first and second molds to form a cavity between the molds. A plastic material is injected into the cavity and is then set. A plane including a tangent at an apex of the optical surface of at least one of both the first and second molds is inclined at a predetermined angle to an optical axis of the lens.

4 Claims, 2 Drawing Sheets

PLASTIC LENS MOLDING APPARATUS

BACKGROUND OF THE INVENTION

The present invention relates to an apparatus for molding a plastic lens, and more particularly relates to a plastic lens molding apparatus in which a liquid plastic material is injected into a cavity defined between optical surfaces of a pair of molds oppositely arranged, and is then set to produce the plastic lens.

Recently, mold lenses made of plastics are used for most of spectacle lenses in place of glass lenses. In sight curing plastic lenses, there are lenses for short-sightedness, presbyopia and long-sightedness and squint. Among them, optical surfaces of progressive power spectacle lenses and squint curing spectacle lenses are designed to produce prismatic effect in geometric central regions thereof.

To injection mold these kinds of plastic lenses, a pair of molds formed to have predetermined spherical optical surfaces are used. These molds are oppositely placed to define a cavity having a thickness equal to the lens thickness. In this state, a pressure sensitive adhesive tape is applied over the peripheries of the molds. A liquid plastic material is injected into the cavity, and is then solidified to produce a lens. (see Japanese unexamined patent publication 63(1988)-23890).

FIG. 6 illustrates a semi-finished product 1 injection molded. This partially fabricated item undergoes a secondary cutting processing, and thereby a prism is formed at the geometric center of the optical surface of the lens. As shown in FIG. 7, a jig 2 is attached to the convex spherical surface 1a of the semi-finished item 1. The attached surface 4 of the jig 2 is inclined an angle θ to a reference surface 3. Accordingly, the semi-finished item 1 is attached with the center line 5 inclined at the angle θ to the reference surface 3. The semi-finished item 1 is cut by setting a center of curvature on the axis of the jig 2 to form a spherical optical surface 6 with an arc R. Polishing is applied to the optical surface 6 using aluminum oxide, and then the jig 2 is removed. Thus, a plastic lens 7 is, as shown in FIG. 9, formed, having a prism formed at a geometric central region of the optical surface.

This earlier attempt needs many fabrication steps: the jig is attached to the semi-finished item after the latter has been injection molded; then, the spherical optical surface is formed; and finally the item is subjected to polishing. About a half of the semi-finished item is removed to produce a chip, and this deteriorates yield of the lens, resulting in a considerable rise in production cost.

SUMMARY OF THE INVENTION

Accordingly, it is an object of the present invention to provide a plastic lens molding apparatus which is capable of overcoming the problems previously mentioned while it is possible to form a prism having a predetermined prism diopter at the geometrical center region of the optical surface of the lens.

It is another object of the present invention to provide a plastic lens molding apparatus which is capable of reducing the production cost of the lens by obviating several steps of attaching a jig, cutting the semi-finished item, and polishing the optical surface. The production cost is also reduced by improving the yield of the lens.

To achieve these and other objects, the present invention provides a plastic lens molding apparatus of the type in which: a first mold, having a concave optical surface, and a second mold, having a convex optical surface, are arranged so that the optical surfaces oppositely face to each other, each of the optical surfaces having an apex; an adhesive tape is applied over both the first and second molds to form a cavity between the molds; and a plastic material is injected into the cavity and is then set. A plane including a tangent at the apex of the optical surface of at least one of both the first and second molds is inclined at a predetermined angle to an optical axis of the lens.

According to the present invention, the geometric central region of the optical surface of the at least one mold is inclined at a predetermined angle to the tangent which passes through the apex of the geometric central region, and hence a prism having a predetermined power of prism is formed in the geometric central region of the plastic lens as a product. Furthermore, according to the present invention, a plastic material is injected into the cavity defined by the optical surfaces of the pair of the molds, the optical surfaces having predetermined curvatures. Then, the plastic material is set. This process enables steps of attachment of a jig, cutting, and polishing to be omitted, and hence the production cost is greatly reduced. Moreover, according to the present invention the need for the cutting step is obviated, and the plastic lens molding apparatus of the present invention is improved in yield.

DETAILED DESCRIPTION OF THE PREFERRED EMBODIMENTS OF THE INVENTION

Several embodiments of the present invention will be described with reference to the accompanying drawings.

Figure 1:
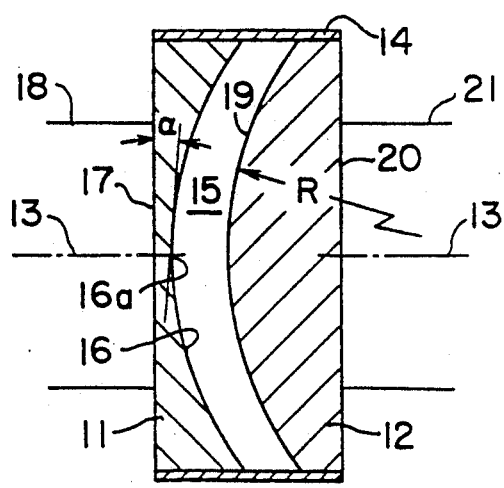
FIG. 1 is an axial sectional view of a plastic lens molding apparatus as one embodiment of the present invention.

FIG. 1 illustrates a plastic lens molding apparatus according to the present invention. The plastic lens molding apparatus includes a first mold 11 and a second mold 12, which are arranged along an axis 13. A pressure sensitive adhesive tape 14 is applied over the peripheries of both the first mold 11 and the second mold 12 to bridge them to form a cavity 15.

The first mold 11 has a concave spherical optical surface 16 and a supporting surface 17 which is perpendicular to the common axis 13. After being centered, the first mold 11 is vacuum sucked at the central portion of the supporting surface 17 thereof with a chuck 18.

On the other hand, the second mold 12 includes a convex spherical optical surface 19 and a supporting surface 20. The supporting surface 20 is perpendicular to the common axis 13. After being centered, the second mold 12 is also vacuum sucked at the central portion of the supporting surface 20 thereof with another chuck 21.

According to the present invention, a plane, including a tangent at the geometric center 16a of the optical surface 16, and the supporting surface 17 is not parallel with each other but intersect at a predetermined angle α. Accordingly, the center of curvature of the geometric center region of the optical surface 16 is sidewardly away from the common axis 13. The optical surface 16 may be spherical or non-spherical.

The optical surface 19 of the second mold 12 is a convex spherical surface, and the center of curvature of the radius R of curvature is on the common axis 13.

In the apparatus, a plastic material is injected into the cavity 15 defined between the first mold 11 and the second mold 12, and is then solidified. Then, the adhesive tape 14 is removed to take out the plastic lens between the molds 11 and 12.

Figure 2:
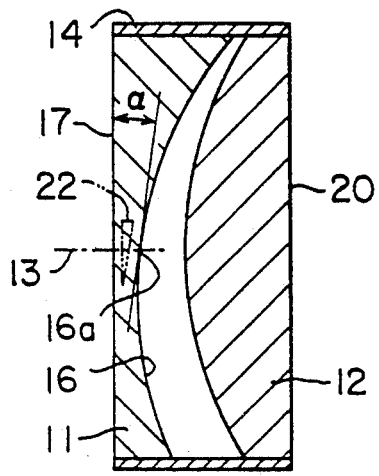
FIG. 2 is an axial sectional view of a squint curing lens mold according to the present invention, in which a resin is injected into the cavity of the mold.
Figure 3:
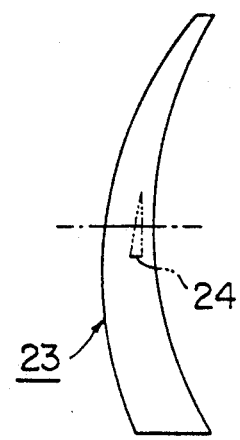
FIG. 3 is an axial sectional view of a squint curing lens injection molded by the mold of FIG. 2.

FIGS. 2 and 3 illustrate how to produce a squint curing spectacle lens. The first mold 11 has an optical surface 16 and a supporting plane 17. The supporting surface 17 is perpendicular to the axis 13. The optical surface 16 is formed so that a plane including a tangent at the apex 16a is inclined at an angle α to the supporting surface 17. Accordingly, at the geometric center of the first mold 11 there is formed an imaginary prism 22 indicated by the triangle in FIG. 2. FIG. 3 illustrates a squint curing spectacle lens 23 produced by such molds. In the central portion of this plastic lens 23, there is formed a prism 24 indicated by the imaginary triangle.

Figure 4:
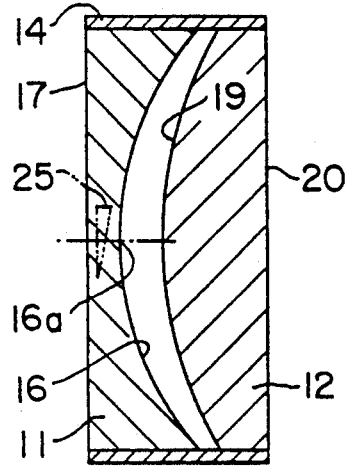
FIG. 4 is an axial sectional view of a progressive power lens mold according to the present invention, in which a resin is injected into the cavity of the mold.
Figure 5:
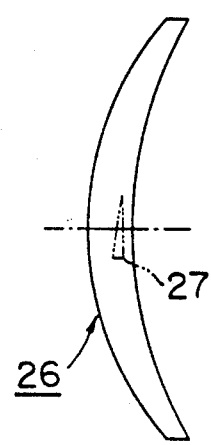
FIG. 5 is an axial sectional view of a progressive power lens injection molded by the mold of FIG. 4.
Figure 6:
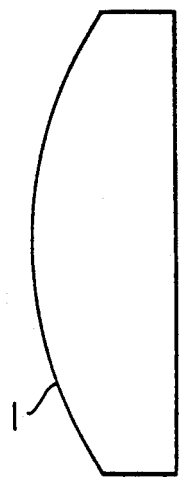
FIG. 6 is a side view of a conventional semi-finished product.
Figure 7:
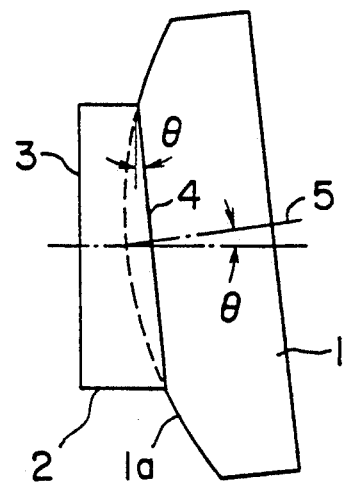
FIG. 7 is a side view of the semi-finished product of FIG. 6 with a jig attached.
Figure 8:
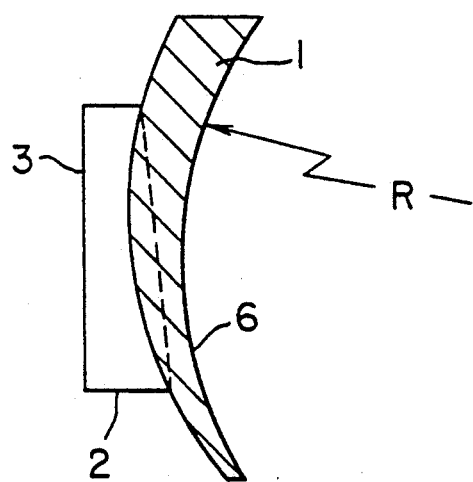
FIG. 8 is the semi-finished product of FIG. 6 with an optical surface cut.
Figure 9:
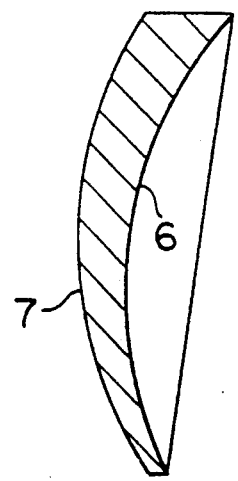
FIG. 9 is an axial sectional view of a conventional plastic lens.

FIGS. 4 and 5 show another embodiment of the present invention, in which a progressive power lens is produced. Also in this embodiment the first mold 11 has a supporting surface 17 and an optical surface 16. In the central portion of the mold 11, there is formed a prism indicated by an imaginary triangle. On the other hand, the second mold 12 is provided with a supporting surface 20 and an optical surface 19. The optical surface 19 is formed by a convex spherical surface having a center of curvature placed on an axis 13. FIG. 5 illustrates a progressive power lens 26 which has been injection molded by the molds previously mentioned, and a prism 27 indicated by the imaginary triangle is formed in the center region of the lens.

The prism 24 of the plastic lens 23 injection molded corresponds in prism diopter to the prism 22 of the first mold 11. The prism 27 of the plastic lens 26 corresponds in prism diopter to the prism 25 of the first mold 11.

In the embodiment previously described, a thermosetting compound which has a benzene ring, naphthalene ring, ester link, carbonate link, urethane link in the molecular is used as the liquid thermosetting compound which is the material of the plastic lens.

As the base sheet of the adhesive tape 14, a proper material may be selected from a paper, cloth and film. Preferably, biaxial oriented polypropylene film or polyethylene terephthalate film is used as the base sheet. The films preferably have a thickness of about 30 to about 100 μm. An adhesive, such as a rubber adhesive, acrylic adhesive, silicone adhesive and fluoro adhesive, is preferably used for the adhesive tape 14.

In the preceding embodiments, one of the molds 11 and 12 is provided at the apex of the optical surface 16 thereof with the prism effect, but each of the molds 11 and 12 may be provided with a prism.

EXAMPLE 1

3 parts by weight of Di-isopropyl Peroxydicarbonate was mixed with 100 parts by weight of well known CR-39 (trade name) to produce a thermosetting composition as a plastic material. (refractive index nd = 1.50 after set) As the adhesive tape, an adhesive tape sold by Sekisui Kagaku Kabushiki Kaisha, Japan, under a trademark "Orien Tape" was used. A crown glass with a refractive index nd = 1.523 was used for the molds.

The thermosetting composition was set by polymerizing it in a constant temperature oven by gradually elevating the temperature from 40° C. to 90° C. in 20 hours, and was then cooled to 60° C., after which the adhesive tape was removed and the molds were separated.

The lens was evaluated by measuring power of prism with a lens meter fabricated by Nippon Kogaku K.K., Japan, with a tradename "PL-2".

The molds used included prisms having various lens prism diopters shown in Table 1. The lenses produced had powers of −2.00 dioptry and +2.00+1.00 dioptry and a diameter 80 mm.

The results of the measurement are given in Table 1 which shows that powers of prisms which corresponded to those of the molds were obtained.

TABLE 1

| Power of lens produced (dioptry) | Power of prism contained in molds | | Lens prism diopter | Note |
|---|---|---|---|---|
| | Concave mold | Convex mold | | |
| −2.00 | 0 | 0 | 0 | — |
| | 1.08 | 0 | 1.00 | — |
| | 2.15 | 0 | 2.00 | — |
| | 1.08 | 1.08 | 2.00 | *1 |
| | 1.08 | 1.08 | 0 | *2 |
| | 2.15 | 2.15 | 4.00 | *1 |
| | 2.15 | 2.15 | 0 | *2 |
| +2.00 | 0 | 0 | 0 | — |
| | 1.08 | 0 | 1.00 | — |
| +1.00 | 2.15 | 0 | 2.00 | — |
| | 1.08 | 1.08 | 2.00 | *1 |
| | 1.08 | 1.08 | 0 | *2 |
| | 2.15 | 2.15 | 4.00 | *1 |
| | 2.15 | 2.15 | 0 | *2 |

*1: The convex and concave molds were placed the same in prism base direction, that is, the prisms are placed in parallel translated positions to each other.
*2: The convex and concave molds were placed oppositely in the prism base direction, that is, the prisms are placed in positions mirror symmetric to each other.

EXAMPLE 2

50 parts by weight of 2,2-bis[3,5-dibrome-4-(2-methacryloyloxyethoxY)phenyl]propane, 50 parts by weight of styrene and 2 parts by weight of t-Butyl Peroxylpivalate were mixed together to produce a thermosetting composition as a plastic material. (refractive index nd = 1.60 after set) Prisms contained in the molds are indicated in Table 2. The powers of lenses produced were −1.00 dioptry and −1.00 −1.00 dioptry, and had a diameter 75 mm. The other conditions of the tests were the same as Example 1. The results are given in Table 2, from which it was confirmed that powers of prisms which corresponded to molds had obtained.

TABLE 2

| Power of lens produced (dioptry) | Power of prism contained in molds | | Lens prism diopter | Note |
|---|---|---|---|---|
| | Concave mold | Convex mold | | |
| −1.00 | 0 | 0 | 0 | — |
| | 0.44 | 0 | 0.50 | — |
| | 1.33 | 0 | 1.50 | — |
| | 0.44 | 0.44 | 1.00 | *1 |
| | 0.44 | 0.44 | 0 | *2 |
| | 1.33 | 1.33 | 3.00 | *1 |
| | 1.33 | 1.33 | 0 | *2 |
| −1.00 | 0 | 0 | 0 | — |
| | 0.44 | 0 | 0.50 | — |
| | 1.33 | 0 | 1.50 | — |
| −1.00 | 0.44 | 0.44 | 1.00 | *1 |
| | 0.44 | 0.44 | 0 | *2 |
| | 1.33 | 1.33 | 3.00 | *1 |
| | 1.33 | 1.33 | 0 | *2 |

*1: The convex and concave molds were placed the same in the prism base direction, that is, the prisms are placed in parallel translated positions to each other.
*2: The convex and concave molds were placed oppositely in the prism base direction, that is, the prisms are placed in positions mirror symmetric to each other.

the prism base direction, that is, the prisms are placed in parallel translated positions to each other. *2: The convex and concave molds were placed oppositely in the prism base direction, that is, the prisms are placed in positions mirror symmetric to each other.

What is claimed is:

1. A plastic lens molding apparatus comprising
a) a first mold;
b) a second mold, each of said molds having an inner and an outer side, the first mold having a concave optical surface on its inner side and a first supporting surface to which vacuum suction can be applied on its outer side, the second mold having a convex optical surface on its inner side and a second supporting surface to which vacuum suction can be applied on its outer side, said first mold being disposed with respect to said second mold such that the concave and convex optical surfaces face each other and have a common axis to which the first and second supporting surfaces are perpendicular, the respective optical surfaces of the first and second molds each having an apex, the optical surface of at least one of the molds being disposed with respect to the supporting surface of said at least one mold such that a plane including a tangent at the apex of the optical surface of said at least one mold is inclined relative to the supporting surface of said at least one mold;
c) tape means for application to the first and second molds so as to form a cavity between the molds into which a plastic material can be injected and set whereby to form a lens having an optical axis which is perpendicular to said first and second supporting surfaces, and
d) chuck means for applying vacuum suction to at least a first portion of said first supporting surface and a second portion of said second supporting surface to hold said molds in a desired position with the first and second supporting surfaces, including said first and second portions, disposed in planes perpendicular to the common axis.

2. An apparatus as claimed in claim 1, wherein the concave and convex optical surfaces have curvatures and are disposed with respect to one another such that the respective molds and the tape means form a cavity from which a lens having prism effect can be formed.

3. An apparatus as claimed in claim 1, wherein said at least one mold comprises said first mold.

4. An apparatus as claimed in claim 1, wherein said tape means comprises adhesive tape, and said chuck means comprises a first chuck for vacuum sucking said first supporting surface and a second chuck for vacuum sucking said second supporting surface.

* * * * *